US012570164B2

(12) United States Patent
Lethellier

(10) Patent No.: US 12,570,164 B2
(45) Date of Patent: Mar. 10, 2026

(54) SYSTEM AND METHOD FOR FIELD ADJUSTMENT IN WIRELESS CHARGING PADS

(71) Applicant: Wireless Advanced Vehicle Electrification, LLC, Salt Lake City, UT (US)

(72) Inventor: Patrice Lethellier, Salt Lake City, UT (US)

(73) Assignee: Wireless Advanced Vehicle Electrification, LLC, Salt Lake City, UT (US)

( * ) Notice: Subject to any disclaimer, the term of this patent is extended or adjusted under 35 U.S.C. 154(b) by 988 days.

(21) Appl. No.: 17/731,237

(22) Filed: Apr. 27, 2022

(65) Prior Publication Data

US 2023/0347757 A1 Nov. 2, 2023

(51) Int. Cl.

| | |
|---|---|
| *H02J 50/90* | (2016.01) |
| *B60L 53/12* | (2019.01) |
| *B60L 53/38* | (2019.01) |
| *H02J 50/12* | (2016.01) |
| *H02J 50/40* | (2016.01) |

(52) U.S. Cl.
CPC .............. *B60L 53/12* (2019.02); *B60L 53/38* (2019.02); *H02J 50/12* (2016.02); *H02J 50/402* (2020.01); *H02J 50/90* (2016.02)

(58) Field of Classification Search
CPC ........ B60L 53/12; B60L 53/38; B60L 53/122; B60L 53/22; B60L 53/67; H02J 50/12; H02J 50/402; H02J 50/90; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 9,731,614 B1 * | 8/2017 | Sarwat ................... | B60L 53/12 |
| 10,668,829 B2 * | 6/2020 | Von Novak, III ...... | B60L 53/39 |
| 11,360,587 B1 * | 6/2022 | Wang ...................... | G06F 3/016 |

(Continued)

FOREIGN PATENT DOCUMENTS

WO 2019196070 A1 10/2019

OTHER PUBLICATIONS

PCT Application No. PCT/US2023/018185 filed Apr. 11, 2023, International Search Report and Written Opinion of the International Searching Authority mailed Jul. 27, 2023.

*Primary Examiner* — Daniel Cavallari
*Assistant Examiner* — Brian K Baxter
(74) *Attorney, Agent, or Firm* — Kunzler Needham & Hilton; Bruce R. Needham

(57) ABSTRACT

Described herein is a wireless transfer system that includes a lower charging pad having at least one first winding, the at least one first winding configured to, upon being provided a first current, cause a second current to be induced in the at least one second winding of an upper charging pad. The lower charging pad comprises a combination of one or more inclined portions and a position adjustment mechanism positioned under a movable magnetic structure within the lower charging pad. Parameters of the second current is dependent upon a size of a gap between the one or more first vertical portions and the one or more inclined portions, the size of the gap being adjusted by first changing a position of the one or more vertical portions with respect to the one or more inclined portions.

19 Claims, 12 Drawing Sheets

(56) References Cited

U.S. PATENT DOCUMENTS

| | | | |
|---|---|---|---|
| 2011/0204845 A1* | 8/2011 | Paparo | H02J 7/0044 |
| | | | 320/108 |
| 2017/0063130 A1* | 3/2017 | Sultenfuss | H02J 50/12 |
| 2017/0077759 A1* | 3/2017 | Niizuma | B60L 5/005 |
| 2017/0080815 A1* | 3/2017 | Wechsler | H02J 50/90 |
| 2017/0129345 A1* | 5/2017 | Wechsler | B60L 53/302 |
| 2017/0361724 A1 | 12/2017 | Seong et al. | |
| 2019/0023139 A1* | 1/2019 | Wechsler | B60L 53/39 |
| 2019/0118663 A1* | 4/2019 | Chabaan | B60L 53/665 |
| 2019/0337393 A1 | 11/2019 | Von Novak, III et al. | |
| 2021/0370788 A1* | 12/2021 | Pantic | H02J 50/90 |
| 2021/0380019 A1* | 12/2021 | Livingston | B64U 50/39 |
| 2021/0384754 A1* | 12/2021 | Xu | H01F 7/02 |
| 2022/0379745 A1* | 12/2022 | Harmon | B60L 53/38 |
| 2024/0042632 A1* | 2/2024 | Clarke | B60L 53/12 |

* cited by examiner

200B

200C

300C

SYSTEM AND METHOD FOR FIELD ADJUSTMENT IN WIRELESS CHARGING PADS

BACKGROUND

As the world becomes more aware of the impact that the use of fossil fuels is having on the environment, the demand for environmentally friendly alternatives is increasing. In the realm of transportation, vehicles that are powered by fossil fuels are being replaced by alternatives including partially or fully electric vehicles. In some cases, entire fleets of vehicles, such as busses, are being replaced by electric vehicles. However, despite this increase in popularity, electric vehicles are subject to their own unique set of problems. For example, the range of an electric vehicle is often dependent upon the amount of charge that can be, or is, stored in a battery of that vehicle. This can be, and typically is, mitigated via the use of electric charging stations that may include wireless charging pads. Such wireless charging pads may be optimized for charging efficiency. Wireless charging efficiency can depend on physical alignments between a primary wireless charging pad (sometimes called a stationary wireless charging pad) and a secondary wireless charging pad (sometimes called a mobile wireless charging pad). This is true not only in the 'x' and 'y' directions (e.g., parallel to a driving surface) but also in the 'z' direction (e.g., perpendicular to the driving surface).

SUMMARY

A wireless transfer pad system is described herein in which power is wirelessly transmitted via wireless charging pads. In the system herein, a size of a gap vertical between an upper and lower charging pad may be adjusted (e.g., Z-alignment). In such a system, such an adjustment be used to achieve specified charging parameters for the wireless transfer pad system regardless of a type or size of vehicle being charged by the system.

In various embodiments, a size of the gap between an upper and lower charging pad may be managed by repositioning the upper charging pad along an X-axis with respect to the lower charging pad, repositioning a movable magnetic structure of the lower charging pad along a Z-axis, or some combination of the two manners of repositioning.

The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

In order that the advantages of the invention will be readily understood, a more particular description will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

This disclosure is directed towards techniques for enhancing misalignment tolerance between a primary and a secondary wireless charging pad and, in particular, for enhancing misalignment tolerance in the z-axis direction (e.g., with respect to a vertical gap between the primary and secondary wireless charging pads). In some cases, a size of the vertical air gap between an upper and lower charging pad may be adjusted. In some cases, the size of the gap may be adjusted by repositioning an upper charging pad installed within a vehicle above the lower charging pad. In some cases, the size of the gap may be adjusted by raising or lowering a movable magnetic structure within the lower charging pad. In some cases, the size of the gap may be adjusted by first positioning the upper charging pad with respect to the lower charging pad, detecting (e.g., using one or more sensors) one or more current parameters of the charging system, and then repositioning one or more movable magnetic structures within the lower charging pad to adjust the parameters for optimal charging. Unless otherwise specified, the lower (i.e., primary or ground assembly) wireless charging pad may be relatively stationary and suited to visits by vehicles, and the upper (i.e., secondary or vehicle assembly) wireless charging pad may be mobile relative to the lower wireless charging pad, for example, attached with a vehicle.

Embodiments of the disclosure provide numerous advantages over conventional systems. For example, the system allows a size (and/or an effective size) of an air gap between an upper and lower charging pad to be adjusted in order to better optimize charging by the wireless power transfer system. By adjusting the size of the gap between the charging pads, such a system is able to adapt to optimally charge vehicles both large and small (e.g., regardless of a size of the wheels of the vehicle).

Figure 1:
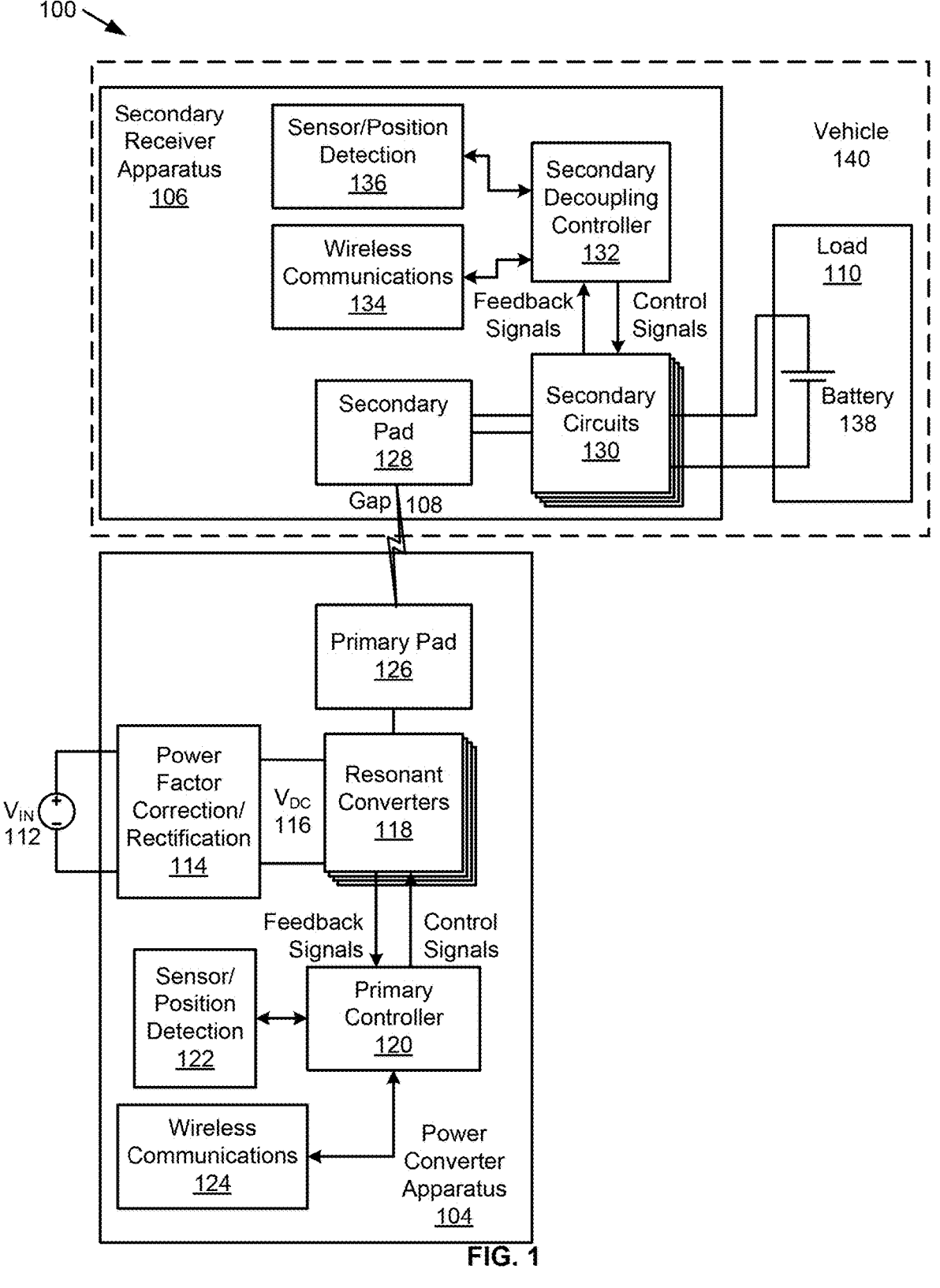
FIG. 1 is a schematic block diagram illustrating an example system with a wireless power transfer ("WPT") pad in accordance with at least one embodiment.

FIG. 1 is a schematic block diagram illustrating one embodiment of a system with a wireless power transfer ("WPT") pad in accordance with at least one embodiment. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, may be called a switching power converter and includes a resonant converter 118 that receives a direct current ("DC") voltage from a DC bus 116.

In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a full-bridge, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary pad 126 (i.e., a primary WPT pad) that receives power from the resonant converter 118. In some embodiments, the primary pad 126 includes two windings, three windings, four windings, etc. which are combined with a magnetic structure and the windings and magnetic structure may also be termed a "pad." In addition, each winding may include one conductor but may also include two or more conductors in parallel. A winding may include a conductive loop that includes conductive wiring configured to carry current, the conductive wiring being arranged so that it winds around an interior area. To support the windings, the power converter apparatus 104 may include multiple resonant converters 118. In one embodiment, portions of the resonant converter 118 and primary pad 126 form a resonant circuit that enables efficient wireless power transfer across the gap 108. In another embodiment, the power converter apparatus 104 includes a switching power converter that is not a resonant converter. The gap 108, in some embodiments includes an air gap, but may also may partially or totally include other substances. For example, where the primary pad 126 is in a roadway, the gap 108 may include a resin, asphalt, concrete or other material just over the windings of the primary pad 126 in addition to air, snow, water, etc. between the primary pad 126 and a secondary pad 128 located in the secondary receiver apparatus 106. In other embodiments, the gap 108 may include water where wireless power transfer occurs under water.

The secondary receiver apparatus 106 includes a secondary pad 128 (i.e. a secondary WPT pad) connected to a secondary circuit 130 that delivers power to the load 110. In the depicted embodiment, the secondary pad 128 may include multiple windings, which may also be termed "pads." Each winding may feed a separate secondary circuit 130 or a single secondary circuit 130. The secondary receiver apparatus 106 may also include a secondary decoupling controller 132 that controls the secondary circuit 130 and may also be in communication with sensors and/or position detection 136 and wireless communications 134 coupled with the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other portable load that would benefit from receiving power wirelessly.

In one embodiment, the secondary circuit 130 includes a portion of resonant circuit that interacts with the secondary pad 128 and that is designed to receive power at a resonant frequency. In another embodiment, the secondary circuit 130 includes a power conditioning circuit that is not a resonant circuit. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The resonant converter 118, in one embodiment, includes an active switching section coupled with a resonant circuit formed with components of the resonant converter 118 and the primary pad 126. The resonant converter 118 is described in more detail with regard to FIGS. 2A-2D.

Figure 2A:
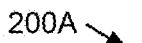
FIG. 2A is a schematic block diagram illustrating an example power converter apparatus in accordance with at least one embodiment.

FIG. 2A is a schematic block diagram illustrating one embodiment 200A of a power converter apparatus 104. The power converter apparatus 104 is connected to a power source 112 and includes a power factor correction and rectification circuit 114 connected to a DC bus 116 feeding a resonant converter 118 connected to a primary pad 126 as described with regard to the WPT system 100 of FIG. 1.

The resonant converter 118 includes a switching module 202 and a tuning section 204. In one embodiment, the switching module 202 includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1*a* and the ground is connected to the negative connection of the tuning section 204 through inductor L1*b* while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section 204 simulating an AC waveform. The AC waveform is typically imperfect due to harmonics.

Typically, switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching.

The tuning section 204 of the resonant converter 118 and the primary pad 126 are designed based on a chosen topology. For example, the resonant converter 118 and primary pad 126 may form an inductor-capacitor-inductor ("LCL") load resonant converter, a series resonant converter, a parallel resonant converter, and the like. The embodiment depicted in FIG. 2A includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. In some embodiments, the power converter apparatus 104 includes a single series capacitor in the tuning section 204 or in the primary pad 126. While FIG. 2A is focused on the resonant converter 118 and primary pad 126, the secondary receiver apparatus 106 includes a secondary pad 128 and a secondary circuit 130 that typically includes a tuning section 204 where the inductance of the secondary pad 128 and capacitance of the tuning section 204 of the secondary circuit 130 form a resonant frequency and the secondary pad 128 and secondary circuit 130 have voltage issues similar to the primary pad 126 and resonant converter 118. In other embodiments, the tuning section 204 and primary pad 126 are not designed to produce a resonance, but instead condition voltage from the switching module 202. For example, the tuning section 204 may filter out harmonic content without filtering a switching frequency.

Figure 2B:
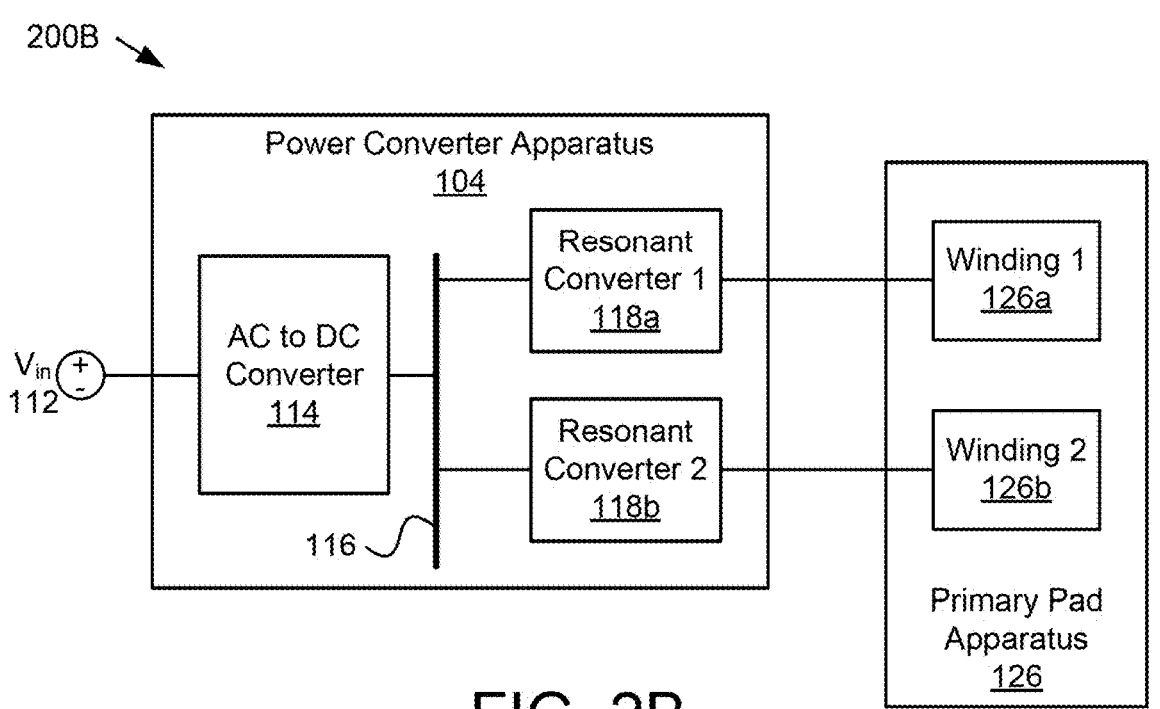
FIG. 2B is a schematic block diagram illustrating an example power converter apparatus with two resonant converters feeding windings of one or more WPT pads in accordance with at least one embodiment.

FIG. 2B is a schematic block diagram illustrating one embodiment 200B of a power converter apparatus 104 with two resonant converters 118*a-b* feeding windings 1216*a-b* of one or more WPT pads 126. FIG. 2B is a schematic block diagram illustrating one embodiment 201 of a power converter apparatus 104 with two resonant converters 118*a-b* feeding windings 126*a-b* of one or more primary pads 126. FIG. 2B is presented in a one-line diagram format. One of skill in the art will recognize that each line between elements represents two or more conductors. The power source 112, power factor correction and rectification circuit 114 and DC bus 116 are substantially similar to those described in the embodiment 200A of FIG. 2A. The power converter apparatus 104 includes two resonant converters 118*a-b* (generically or individually "118") where each resonant converter 118 includes a switching module 202 and may include a tuning section 204. Each resonant converter 118 feed a winding (e.g. 126*a*) of a primary pad 126, which may include multiple windings 126*a-b*. A resonant converter (e.g. 118*a*) may feed an individual primary pad 126.

Figure 2C:
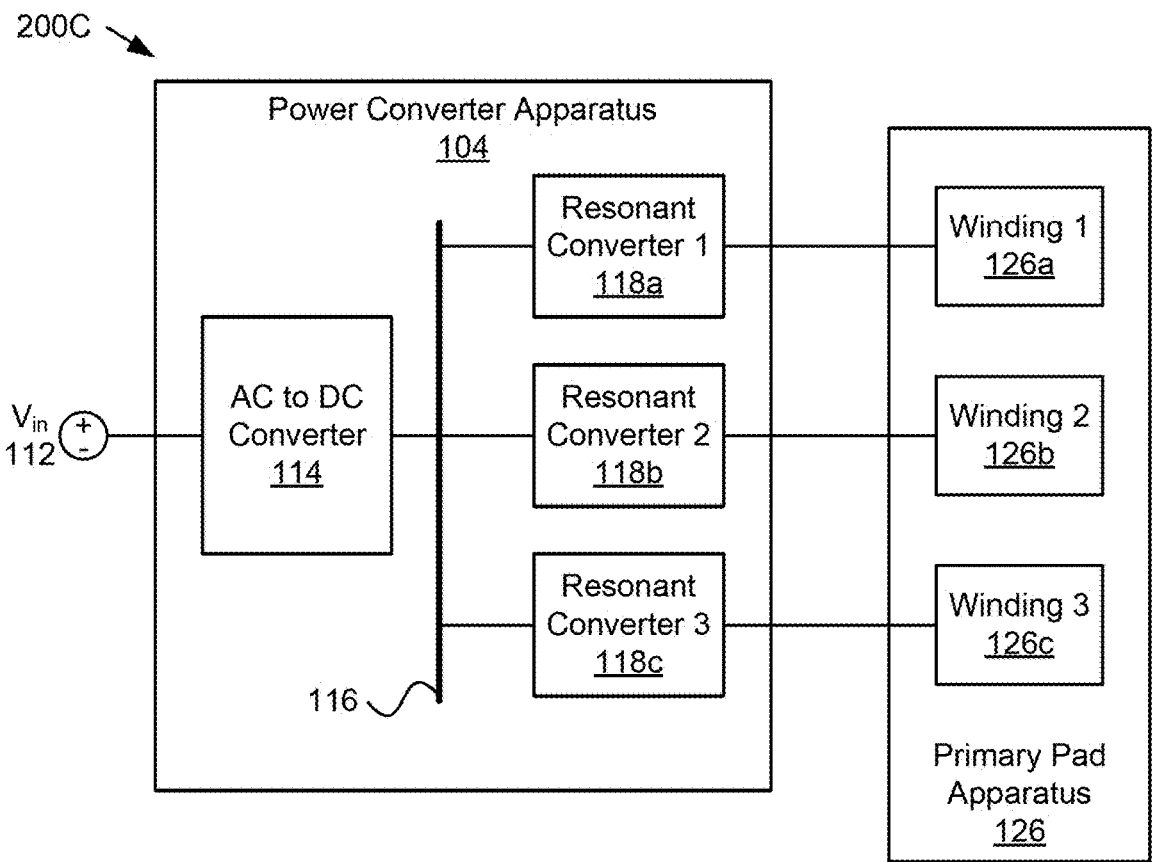
FIG. 2C is a schematic block diagram illustrating an example power converter apparatus with three resonant converters feeding windings of one or more WPT pads in accordance with at least one embodiment.

FIG. 2C is a schematic block diagram illustrating one embodiment 200C of a power converter apparatus 104 with three resonant converters 118*a-c* feeding three windings 126*a-c* of one or more WPT pads 126. The embodiment 200C is substantially similar to the power converter apparatus 104 of FIG. 2B except with three resonant converters 118*a-c* and windings 126*a-c* instead of two. In some embodiments, the resonant converters 118*a-c* produce waveforms that are offset by 120 degrees, which produces a ripple in the primary pad 126 that is minimized due to cancelling effects caused by offset of the waveforms from the resonant converters 118*a-c*.

Figure 2D:
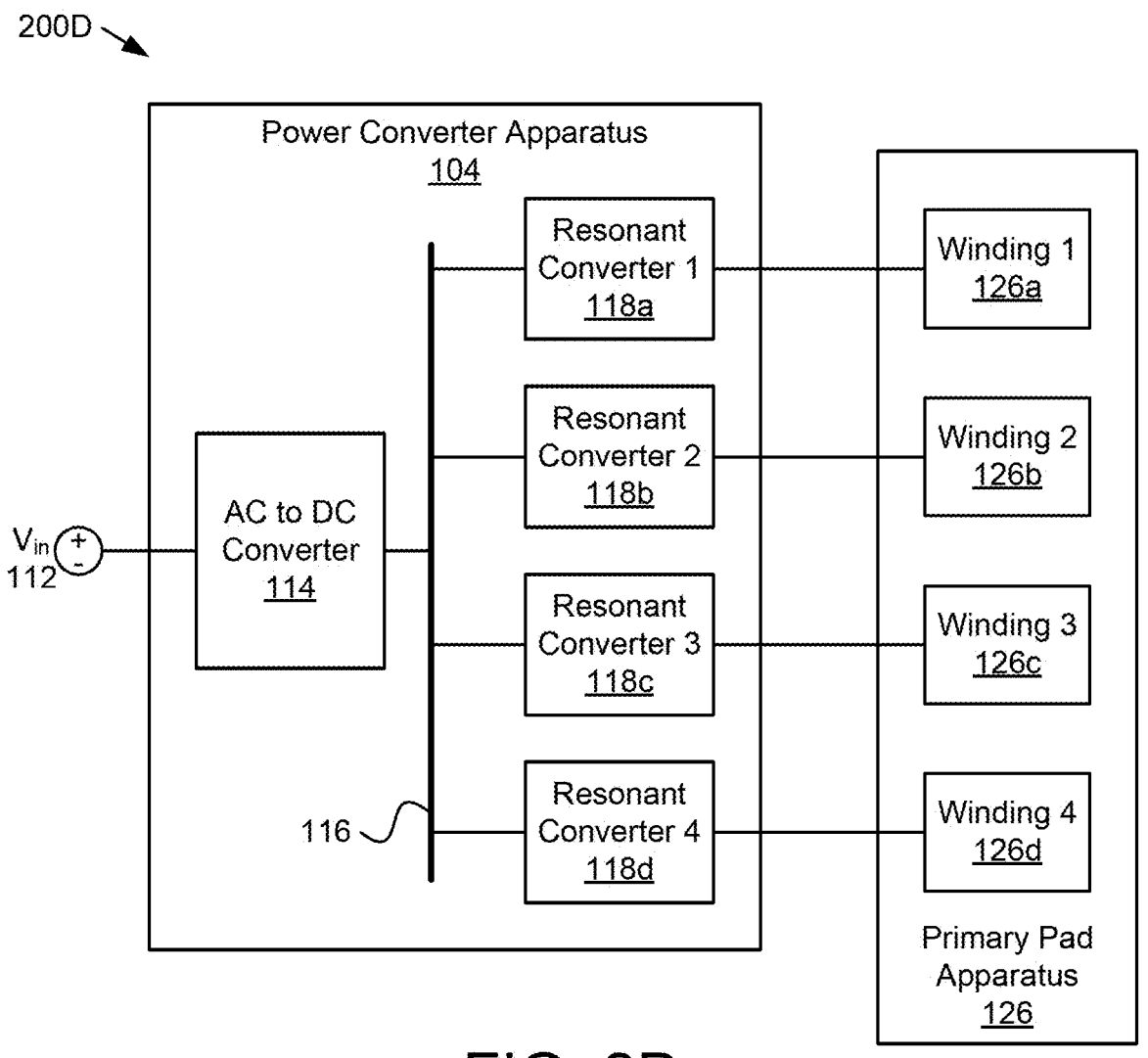
FIG. 2D is a schematic block diagram illustrating an example power converter apparatus with four resonant converters feeding windings of one or more WPT pads in accordance with at least one embodiment.

FIG. 2D is a schematic block diagram illustrating one embodiment 200D of a power converter apparatus 104 with four resonant converters 118*a-d* feeding four windings 126*a-d* of one or more WPT pads 126. The embodiment 200D is substantially similar to the power converter apparatuses 104 of FIGS. 2B or 2C except with four resonant converters 118*a-d* and windings 126*a-d* instead of two or three. In some embodiments, the resonant converters 118*a-d* produce waveforms that are offset by 90 degrees, which produces a ripple in the primary pad 126 that is minimized due to cancelling effects caused by offset of the waveforms from the resonant converters 118*a-d*.

Figure 3A:
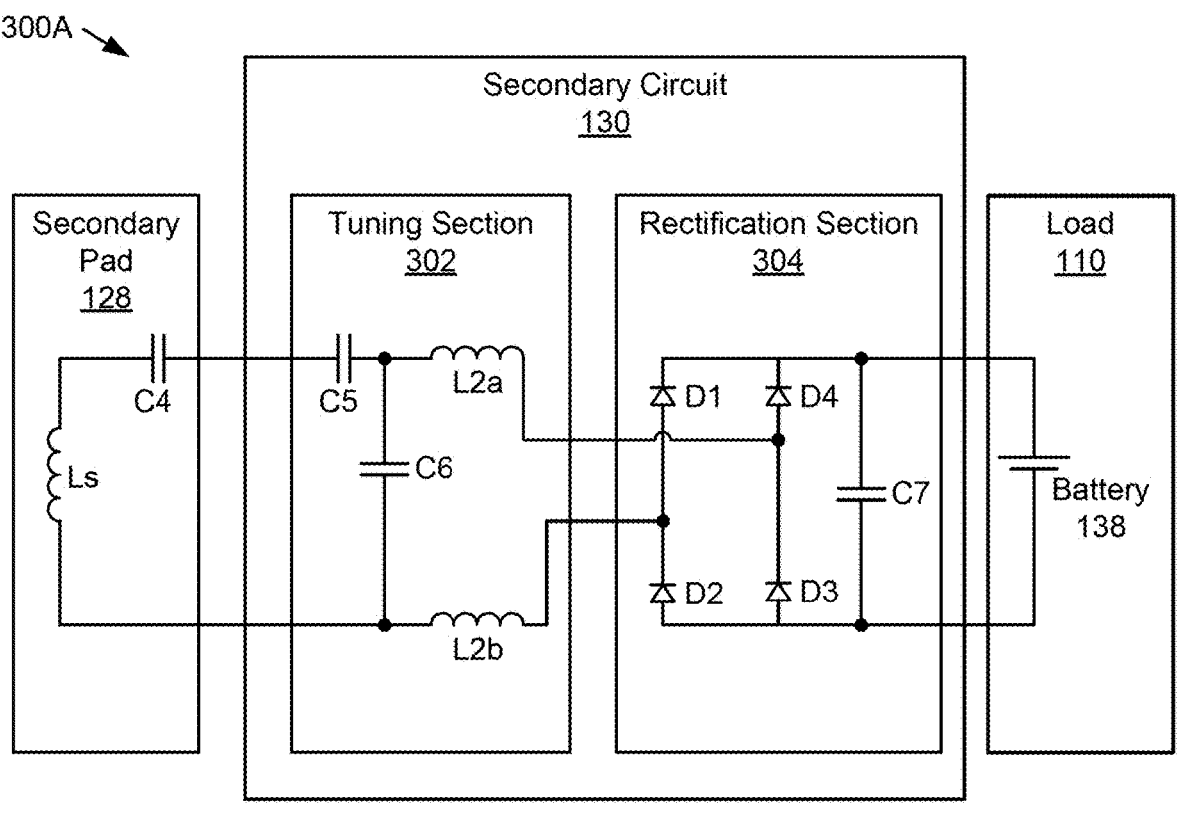
FIG. 3A is a schematic block diagram illustrating an example secondary circuit feeding a load in accordance with at least one embodiment.

FIG. 3A is a schematic block diagram illustrating one embodiment 300A of a secondary circuit 130 feeding a load 110. A secondary pad 128 feeds a tuning section 302 within the secondary circuit 130 and the tuning section 302 feeds a rectification section 304 in the secondary circuit 130, which feeds a load 110.

The secondary pad 128 includes one or more windings arranged to receive power from a primary pad 126. The secondary pad 128 may include a magnetic structure and windings arranged in a pattern that efficiently receives power from the primary pad 126. In one embodiment, the secondary pad 128 mirrors the primary pad 126 transmitting power. In another embodiment, the secondary pad 128 differs from the primary pad 126. For example, the primary pad 126 and secondary pad 128 may be in the form of a WPT pad with vertical sections and a biplane WPT pad as described below. Typically, the secondary pad 128 includes an inductance Ls formed as a result of the windings and the magnetic structure of the secondary pad 128. In one embodiment, the secondary pad 128 includes a capacitor C4. In some embodiments, the secondary pad 128 includes multiple windings with associated inductances Ls and capacitors Cs arranged in parallel or series.

The tuning section 302 includes one or more capacitors C5, C6 and inductors L2a, L2b that are arranged to form a resonant circuit with the secondary pad 128 with a resonant frequency. In some embodiments, capacitor C6 is not present. In one embodiment, the resonant frequency matches a resonant frequency of the primary pad 126 transmitting power. Typically, a resonant frequency is formed between the inductor Ls of the secondary pad 128 and series capacitors C4 and C5 of the secondary pad 128 and/or tuning section 302. In some embodiments, the secondary pad 128 or the tuning section 302 include a single series capacitor C4 or C5. Other capacitors (e.g. C6) and inductors (e.g. L2a, L2b) may form a low pass filter to reduce voltage ripple at the resonant frequency. In other embodiments, a low-pass filter is included after rectification elements in the rectification section 304. For example, a capacitor C7 may be included. One of skill in the art will recognize other configurations of the tuning section 302 that form a resonant tank with the secondary pad 128 and pass energy to the rectification section 304 or another suitable circuit. In other embodiments, the secondary pad 128 does not transfer power at or near a resonant frequency and the inductances and capacitances differ from the secondary pad 128 and tuning section 302 depicted.

A rectification section 304 includes diodes, switches, or other rectification elements to convert alternating current ("AC") power to direct current ("DC") power. The rectification section 304 depicted in FIG. 3 includes a full bridge rectifier with four diodes D1-D4. In some embodiments, the diodes D1-D4 are replaced with active elements, such as switches, which may be used to reduce harmonics, reduce power consumption, and the like. For example, the rectification section 304 may include a switching power converter that controls an output voltage to the load 110.

The load 110, in one embodiment is a battery 138. In other embodiments, the load 110 may include other components, such as a motor, a resistive load, electronics, and the like. In one embodiment, the secondary pad 128, secondary circuit 130 and load 110 are part of a vehicle 140. In other embodiments, the secondary pad 128, secondary circuit 130 and load 110 are part of a computing device, a smartphone, and the like.

Figure 3B:
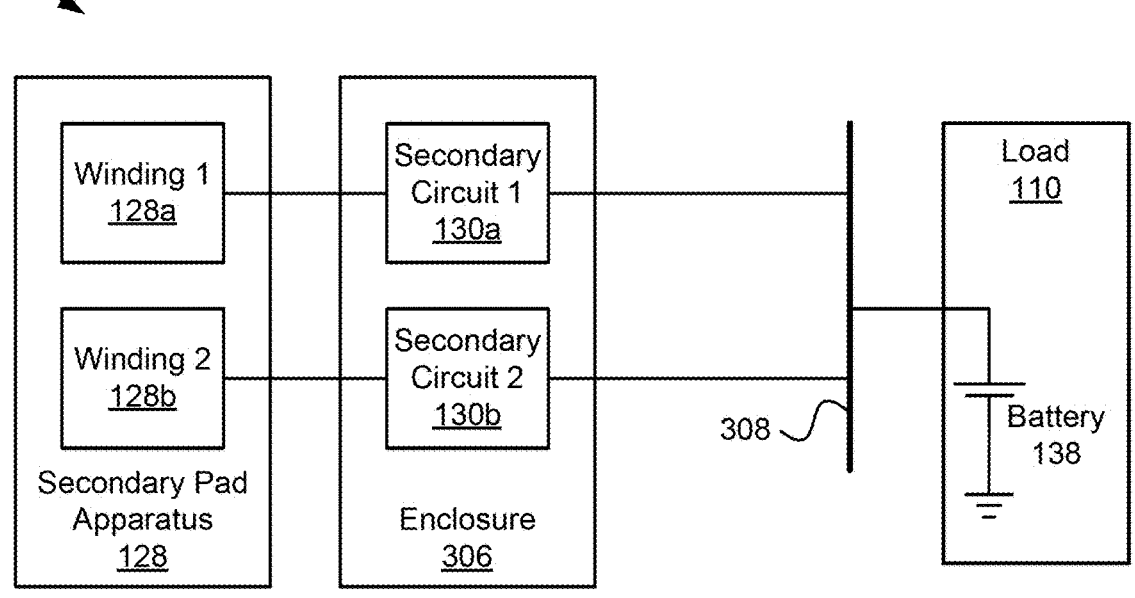
FIG. 3B is a schematic block diagram illustrating an example of two windings of a secondary pad feeding two secondary circuits, which feed a load in accordance with at least one embodiment.

FIG. 3B is a schematic block diagram illustrating one embodiment 300B of two windings 128a-b of a secondary pad 128 feeding two secondary circuits 130a-b, which feed a load 110. The secondary circuits 130a-b, in one embodiment, may be in one or more enclosures 306 and feed a secondary DC bus 308, which feeds the load 110. A secondary pad 128 with two windings 128a-b is advantageous to increase power output and two windings 128a-b may also be used in determining alignment. The secondary pad 128, in some embodiments, is similar to the WPT pad depicted in FIGS. 4 and 5.

Figure 3C:
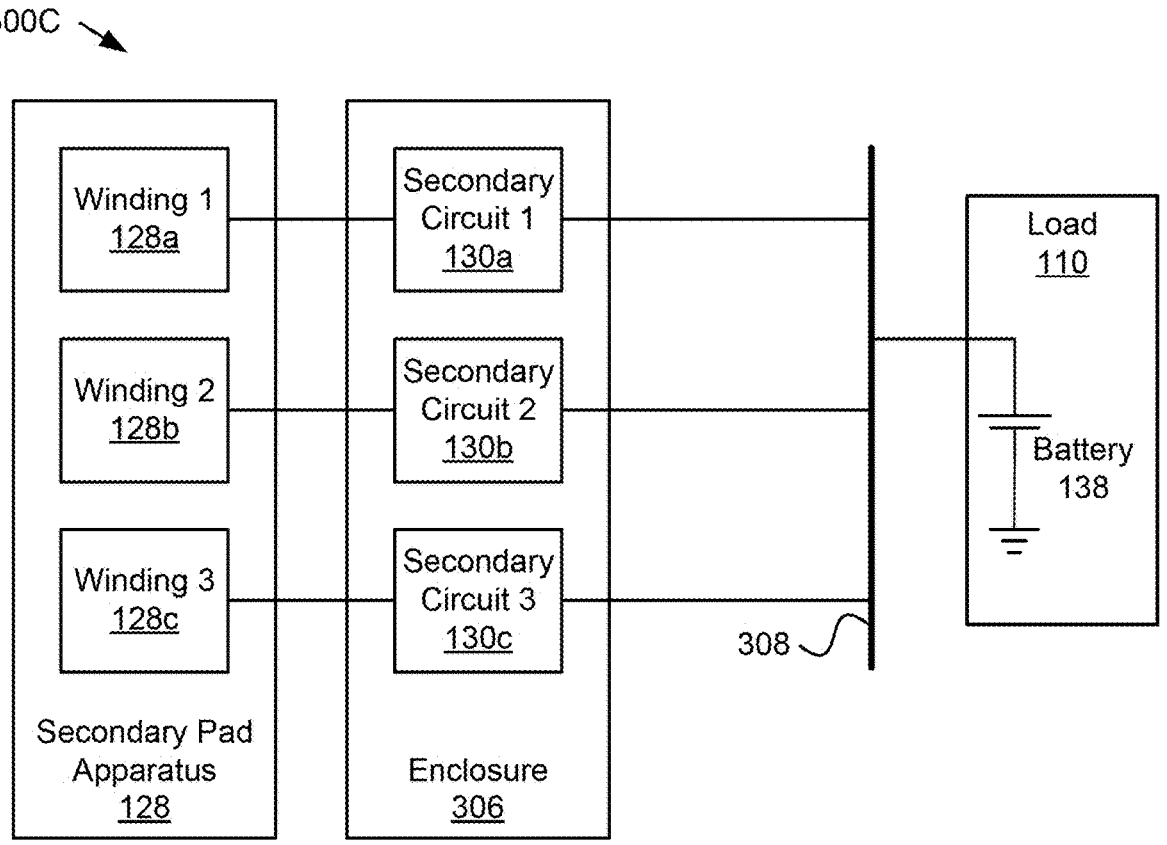
FIG. 3C is a schematic block diagram illustrating an example of three windings of a secondary pad feeding three secondary circuits, which feed a load in accordance with at least one embodiment.

FIG. 3C is a schematic block diagram illustrating one embodiment 300C of three windings 128a-c of a secondary pad 128 feeding three secondary circuits 130a-c, which feed a load 110. As with the embodiment 300B of FIG. 3B, the secondary circuits 130a-c, in one embodiment, may be in one or more enclosures 306 and feed a secondary DC bus

308, which feeds the load 110. A secondary pad 128 with three windings 128a-c is advantageous to be used in a three-phase circuit to increase power output and to decrease noise due to the ripple cancelling effects of three-phase power.

Figure 3D:
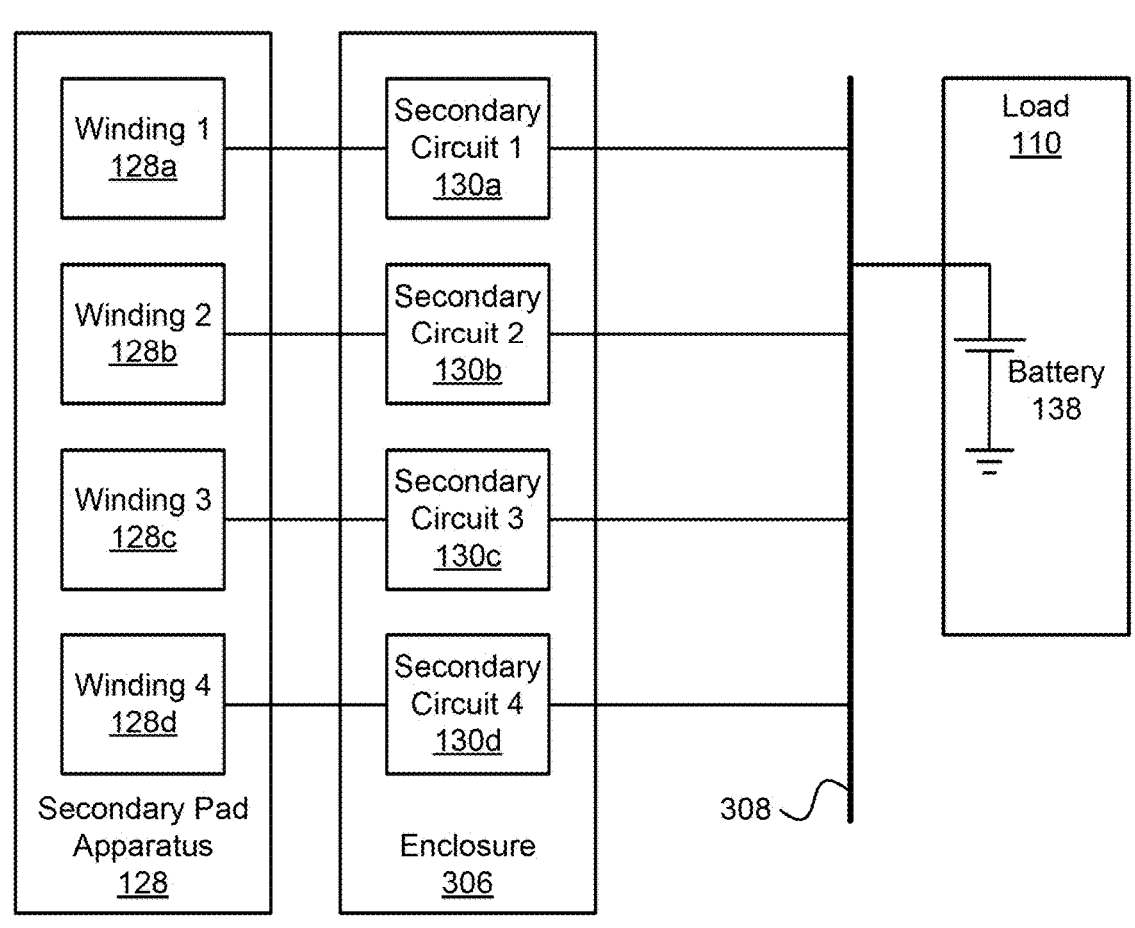
FIG. 3D is a schematic block diagram illustrating an example of four windings of a secondary pad feeding four secondary circuits, which feed a load in accordance with at least one embodiment.

FIG. 3D is a schematic block diagram illustrating one embodiment 300D of four windings 128a-d of a secondary pad 128 feeding four secondary circuits 130a-d, which feed a load 110. As with the embodiment 300B of FIG. 3B, the secondary circuits 130a-d, in one embodiment, may be in one or more enclosures 306 and feed a secondary DC bus 308, which feeds the load 110. A secondary pad 128 with four windings 128a-d is advantageous to be used in a single-phase or four-phase system to increase power output and to decrease noise due to ripple cancelling effects of offset waveforms.

Figure 4:
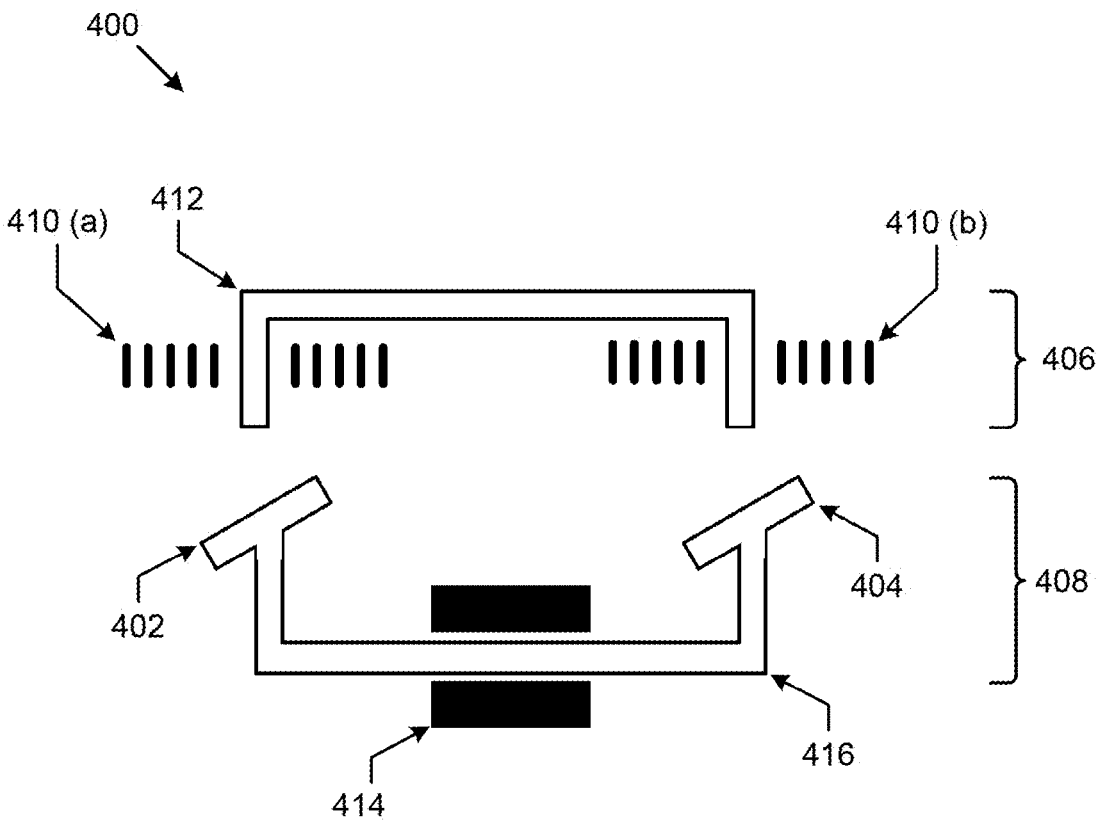
FIG. 4 depicts a first example of a wireless transfer pad in which a gap between wireless transfer pads may be managed in accordance with at least one embodiment.

FIG. 4 depicts a first example of a wireless transfer pad in which a gap between wireless transfer pads may be managed in accordance with at least some embodiments. In the example wireless transfer pad system 400, one or more magnetic structures may include inclined portions 402 and 404. Each of the inclined portions may rest at an angle relative to a plane on which the wireless transfer pad rests. In some embodiments, the angle of each of the inclined portions 402 and 404 are substantially the same.

In embodiments, the wireless transfer pad may include both an upper charging pad 406 and a lower charging pad 408. The upper charging pad may be installed within an electric vehicle in order to receive wireless power transferred from a lower charging pad. The lower charging pad may be configured such that the electric vehicle can be positioned over it to receive wireless transfer of power. For example, the lower charging pad may be embedded within a roadway such that an electric vehicle can be parked over it. It should be noted that the inclined portions 402 and 404 may be included within either the upper charging pad (not shown in FIG. 4) or the lower charging pad (as shown in FIG. 4).

Each of the upper charging pad and the lower charging pad may include a number of windings (e.g., inductive coils) and a magnetic structure (e.g., a ferrite core). For example, the upper charging pad may include windings 410 (*a*) and 410 (*b*). Additionally, a magnetic core 412 may pass through a center opening of each of the windings 410. In such an example, the lower charging pad may also include either separate windings or a single winding 414. Additionally, a second magnetic core 416 may pass through a center opening of the winding 414.

In embodiments that include inclined portions as described herein, the upper charging pad may be installed within a vehicle and the lower charging pad may be installed within a roadway that may be traversed by the vehicle. In such embodiments, one or more markings may be placed upon the roadway to indicate a position in which a vehicle should be stopped. In some cases, different markings may be used to denote positions at which different vehicles should come to a stop in order to be charged.

Figure 5:
FIG. 5 illustrates techniques by which a gap between wireless transfer pads may be managed in accordance with at least one embodiment.
Figure 5:
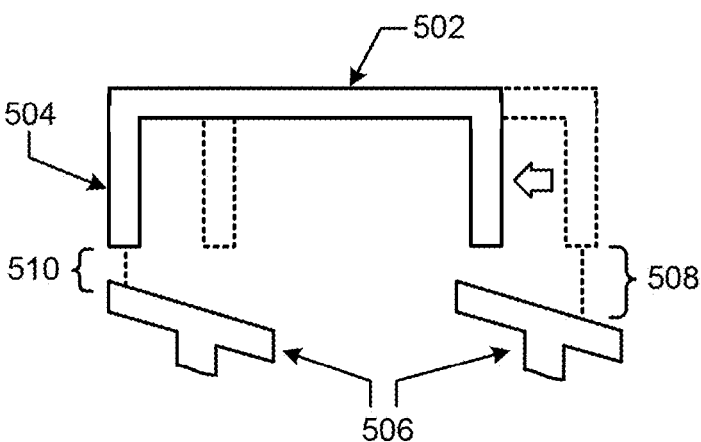

FIG. 5 illustrates techniques by which a gap between a wireless transfer pads may be managed in accordance with some embodiments. In illustration 500, a first magnetic structure 502 (e.g., a ferrite core) within an upper charging pad is moved into position over a second magnetic structure included in a lower charging pad.

During a positioning event, one or more vertical portions 504 of the first magnetic structure of the upper charging pad (e.g., within a vehicle) are positioned over an inclined portion 506 of the second magnetic structure of the lower charging pad. During this positioning event, a size of a gap between the vertical portion 504 and the inclined portion 506 may be managed (e.g., adjusted) to achieve a specified system gain. Particularly, a size of the gap between the two magnetic structures may vary based on their respective positions. For example, a size of the gap 508 between the vertical portion of the first magnetic structure and the inclined portion of the second magnetic structure in a first position may be different from the gap 510 between the vertical portion and the inclined portion in a second position. In accordance with at least one embodiment, the effective size of the gap 510 may be smaller than the effective size of the gap 508.

Figure 6:
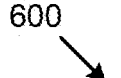
FIG. 6 depicts a second example of a wireless transfer pad in which a gap within the wireless transfer pad may be managed in accordance with at least one embodiment.
Figure 6:
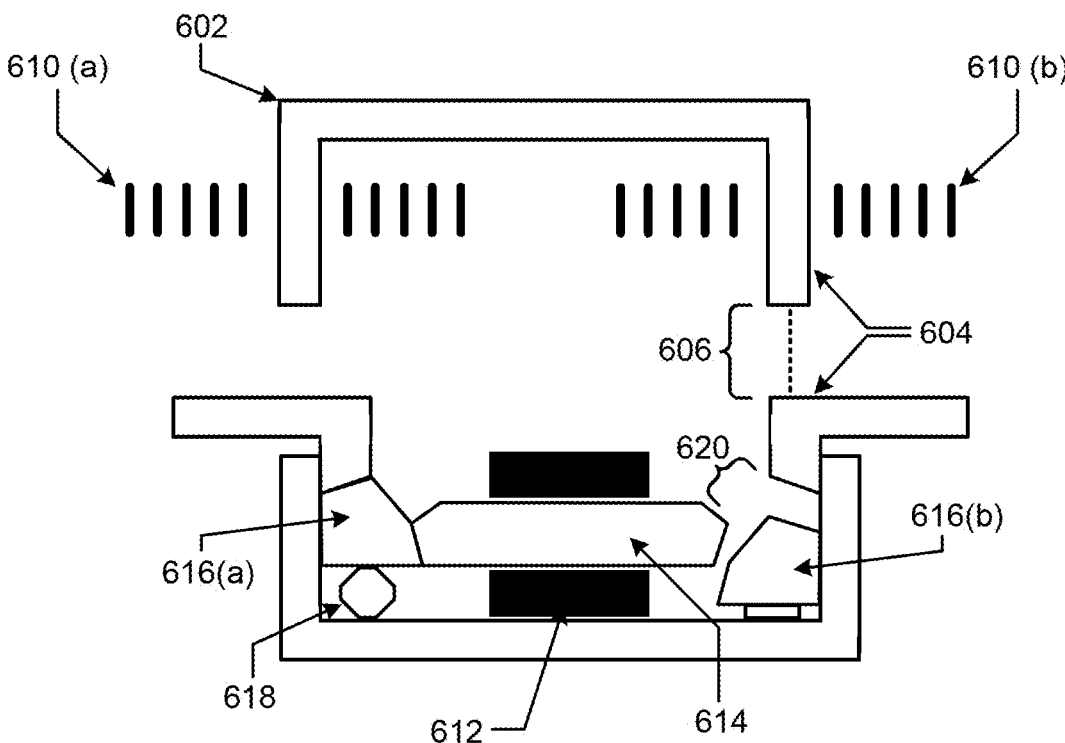

FIG. 6 depicts an example of a wireless transfer pad in which a gap within the wireless transfer pad may be managed in accordance with at least some embodiments. In the example wireless transfer pad 600, one or more magnetic structures 602 may include vertical portions 604, such that a gap 606 may be formed between the respective vertical portions of an upper and lower charging pad.

As described elsewhere, the wireless transfer pad may include both an upper charging pad and a lower charging pad. The upper charging pad may be installed within an electric vehicle in order to receive wireless power transferred from a lower charging pad. The lower charging pad may be configured such that the electric vehicle can be positioned over it to receive wireless transfer of power. For example, the lower charging pad may be embedded within a roadway such that an electric vehicle can be parked over it.

As described elsewhere, each of the upper charging pad and the lower charging pad may include a number of windings (e.g., inductive coils) and a magnetic structure (e.g., a ferrite core). For example, the upper charging pad may include windings 610 (a) and 610 (b). Additionally, a magnetic structure 602 may pass through a center opening of each of the windings 610. In such an example, the lower charging pad may also include either separate windings or a single winding 612. Additionally, a second magnetic structure 614 may pass through a center opening of the winding 612.

In some embodiments, the second magnetic structure 614 is in proximity to one or more movable magnetic structures 616 (e.g., 616 (a) and 616 (b)) that are configured to repositioned via one or more position adjustment mechanisms 618. In these embodiments, the movable magnetic structures may be positioned in a manner such that they are able to be moved to complete a magnetic path. In some embodiments, separate movable magnetic structures may be included on each side of the second magnetic structure. The one or more position adjustment mechanisms may include any suitable mechanism that is configured to reposition the movable magnetic structures. For example, the position adjustment mechanism may be a linear actuator and/or a bladder or other vessel that is configured to expand when filled (e.g., with a gas or liquid) such that it is caused to displace a respective movable magnetic structure. Once moved, the movable magnetic structure may be repositioned to achieve a desired amount of internal gap 620 between the second magnetic structure 614, the movable magnetic structure 616, and a magnetic side portion 604 in proximity to the upper charging pad. In such cases, the internal gap 620 may, in combination with the gap 606, achieve specified parameters for the wireless charging pad. In this way, parameters for the wireless charging pad may be adjusted via the position adjustment mechanism. For example, parameters of the wireless charging pad can be adjusted by inflating or deflating an air bladder positioned under a movable magnetic structure. In accordance with at least one embodiment, the internal gap 620 may be adjusted to compensate for variation in the gap 606 such that if the gap 606 is outside of a desired z-axis misalignment tolerance (e.g., the gap is too large or too small with respect to desired operating parameters) then the internal gap 620 may be adjusted to achieve a combined gap (and/or a combined effective gap distance) that is within the desired tolerance. Accordingly, when a wireless charging pad system has a particular tolerance for z-axis misalignment, embodiments may extend and/or enhance that tolerance. Alternatively, or in addition, adjustment of the internal gap 610 may be utilized to compensate for changes in vehicle battery performance including with respect to optimal DC voltage and/or current input.

Figure 7:
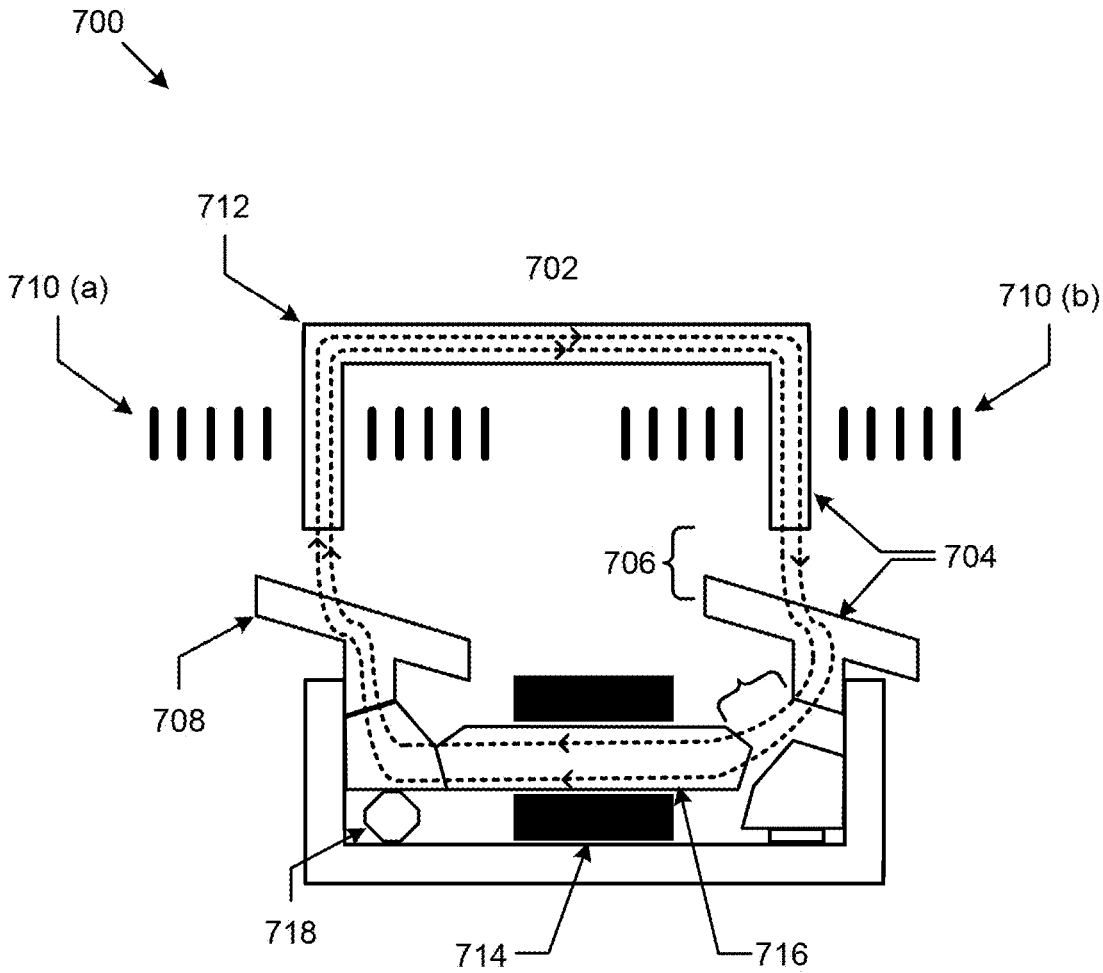
FIG. 7 depicts a third example of a wireless transfer pad in which a gap within the wireless transfer pad may be managed in accordance with at least one embodiment.

FIG. 7 depicts another example of a wireless transfer pad in which a gap within the wireless transfer pad may be managed in accordance with at least some embodiments. The example wireless transfer pad 700 represents a combination of features depicted in FIGS. 4 and 6 respectively. As in the previously presented examples, wireless transfer pad 700 includes one or more magnetic structures 702 that include vertical portions 704, such that a gap 706 may be formed between the respective vertical portions of an upper and lower charging pad. Additionally, the lower charging pad may include inclined portions 708 that are located opposite respective vertical portions 704.

As described elsewhere, each of the upper charging pad and the lower charging pad may include a number of windings (e.g., inductive coils) and a magnetic structure (e.g., a ferrite core). For example, the upper charging pad may include windings 710 (a) and 710 (b). Additionally, a magnetic structure 712 may pass through a center opening of each of the windings 710. In such an example, the lower charging pad may also include either separate windings or a single winding 714, the center of which a second magnetic structure 716 may pass through.

During a positioning event, one or more vertical portions 704 of the first magnetic structure of the upper charging pad (e.g., within a vehicle) are positioned over an inclined portion 708 of the second magnetic structure of the lower charging pad. During such a positioning event, a size of a gap 706 between the vertical portion 704 and the inclined portion 708 may initially be managed (e.g., adjusted) by moving the upper charging pad (which may be installed within a vehicle) horizontally (e.g., along an X-axis) as described with respect to FIG. 5 above. Once the vertical portions of the upper charging pad have been positioned in this way, one or more of the inclined portions 708 of the lower charging pad opposite the vertical portions may be raised or lowered in order to achieve desired parameters of the wireless charging pad via a position adjustment mechanism 718. In such cases, the position adjustment mechanism causes the one or more inclined portions to be repositioned vertically (e.g., along a Z-axis).

In some embodiments, the wireless transfer system may be configured to adjust one or more of its parameters during a charging session. To do so, a vehicle to be charged, as well as an upper charging pad installed within that vehicle, may first be positioned above the lower charging pad within the wireless charging system. Upon the upper charging pad being positioned above the lower charging pad, one or more sensors may obtain information about various parameters of the charging system. For example, one or more sensors may obtain information about a strength of the magnetic field generated by the charging system or an efficiency of power transfer for the system. Once information about the various parameters has been obtained, one or more movable magnetic structures within the lower charging pad may be repositioned in order to cause an adjustment of the parameters (e.g., in order to achieve predetermined parameters).

Figure 8A:
FIG. 8A depicts an example wireless charging pad configuration having two vertical portions in accordance with at least one embodiment.

FIG. 8 depicts multiple exemplary wireless charging pad configurations. Particularly, FIG. 8A depicts a first exemplary wireless charging pad configuration having two vertical portions. In the first exemplary embodiment, each of the vertical portions may pass through windings (e.g., inductive coils) that are out of sync by substantially 180 degrees. In other words, the windings, when provided an electric current, may generate electromagnetic fields that are of a substantially opposite polarity.

Figure 8B:
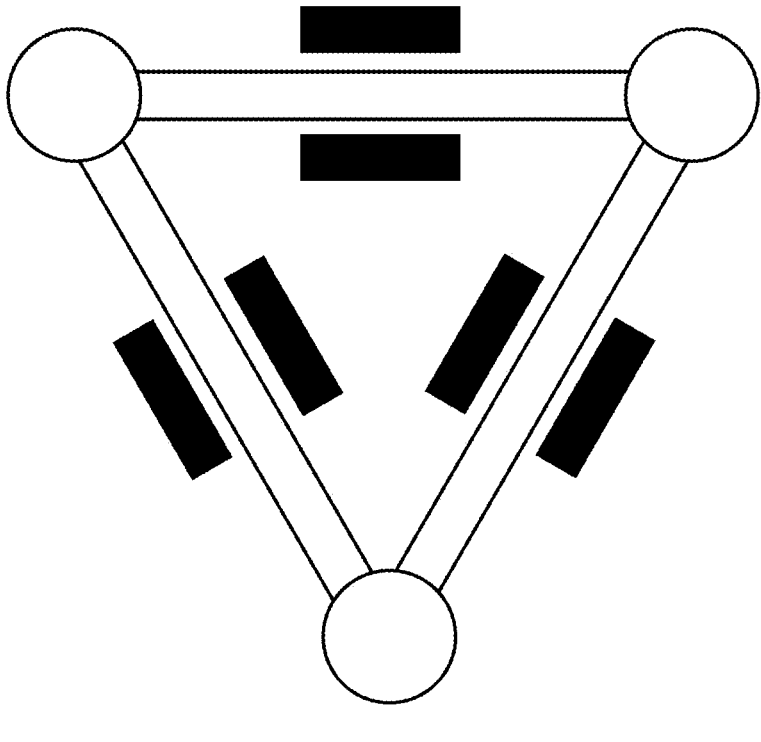
FIG. 8B depicts an example wireless charging pad configuration having three vertical portions in accordance with at least one embodiment.

FIG. 8B depicts a second exemplary wireless charging pad configuration having three vertical portions. In the second exemplary embodiment, each of the vertical portions may pass through windings (e.g., inductive coils) that are out of sync by substantially 120 degrees. In other words, the windings, when provided an electric current, may generate electromagnetic fields that are out of phase.

It should be noted that while FIG. 8 illustrates embodiments of a wireless charging pad that include two or three vertical portions, other embodiments may include any suitable number of vertical portions.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wireless power transfer system comprising:
   a lower charging pad having:

one or more inclined portions; and
      at least one first winding, the lower charging pad being configured to be situated below an upper charging pad within an electric vehicle, the upper charging pad comprising a magnetic structure having one or more vertical portions fixed within the upper charging pad and at least one second winding, a size of a gap between the one or more vertical portions and the one or more inclined portions being adjusted by changing a position of the one or more vertical portions by moving the vehicle with the upper charging pad in a horizontal direction with respect to the one or more inclined portions, wherein the one or more inclined portions are inclined with respect to the vertical portions.

2. The wireless power transfer system of claim 1, wherein the electric vehicle is positioned above the lower charging pad.

3. The wireless power transfer system of claim 1, wherein the lower charging pad is at least partially embedded within a roadway.

4. The wireless power transfer system of claim 1, wherein the at least one first winding is configured to, upon being provided a first current, cause a second current to be induced in the at least one second winding.

5. The wireless power transfer system of claim 4, wherein one or more parameters of the second current are dependent upon a size of the gap between the one or more vertical portions and the one or more inclined portions.

6. The wireless power transfer system of claim 1, wherein the one or more inclined portions comprise a portion inclined at a predetermined angle relative to a horizontal plane.

7. A wireless power transfer system comprising:
   a lower charging pad having:
      a position adjustment mechanism positioned under a movable portion of a first magnetic structure of the lower charging pad separate from other fixed portions of the first magnetic structure of the lower charging pad;
      one or more first vertical portions of the first magnetic structure; and
      at least one first winding, the lower charging pad being configured to be situated below an upper charging pad fixed within an electric vehicle, the upper charging pad comprising a second magnetic structure having one or more second vertical portions fixed within the upper charging pad and at least one second winding, a size of a gap between moveable portion of the first magnetic structure and the fixed portions of the first magnetic structure being adjusted by activating the position adjustment mechanism to move the movable portion of the first magnetic structure with respect to the fixed portions of the first magnetic structure.

8. The wireless power transfer pad of claim 7, wherein the position adjustment mechanism comprises one of a bladder and a balloon configured to be filled with gas or liquid.

9. The wireless power transfer pad of claim 8, wherein upon being filled with gas or liquid, the bladder or balloon is configured to cause the portion of the movable first magnetic structure to be displaced.

10. The wireless power transfer pad of claim 9, wherein the portion of the movable portion of the first magnetic structure is caused to be displaced vertically.

11. The wireless power transfer pad of claim 7, wherein the at least one first winding is configured to, upon being provided a first current, cause a second current to be induced in the at least one second winding.

12. The wireless power transfer pad of claim 11, wherein one or more parameters of the second current is dependent upon a size of a gap between the one or more first vertical portions and the one or more second vertical portions and/or a size of a gap between the movable portion of the first magnetic structure and the fixed portions of the first magnetic structure.

13. A wireless power transfer system comprising:

a lower charging pad having:

a position adjustment mechanism positioned under a movable portion of a first magnetic structure separate from other fixed portions of the first magnetic structure;

one or more inclined portions of the first magnetic structure; and at least one first winding, the lower charging pad being configured to be situated below an upper charging pad fixed within an electric vehicle, the upper charging pad comprising a second magnetic structure having one or more vertical portions fixed within the upper charging pad and at least one second winding, a size of a gap between the one or more vertical portions and the one or more inclined portions being adjusted by changing a position of the one or more vertical portions by moving the vehicle with the upper charging pad in a horizontal direction of travel of the electric vehicle with respect to the one or more inclined portions, a size of a gap between the moveable portion of the first magnetic structure and the fixed portions of the first magnetic structure adjusted by activating the position adjustment mechanism to move the movable portion of the first magnetic structure with respect to the fixed portions of the first magnetic structure, wherein the one or more inclined portions are inclined with respect to the vertical portions.

14. The wireless power transfer pad of claim 13, wherein the position adjustment mechanism is activated in response to data obtained from one or more sensors.

15. The wireless power transfer pad of claim 13, wherein the size of gaps within an magnetic loop formed by the first magnetic structure and the second magnetic structure is adjusted by first changing a position of the one or more vertical portions with respect to the one or more inclined portions and subsequently activating the position adjustment mechanism positioned under the movable portion of the first magnetic structure within the lower charging pad.

16. The wireless power transfer pad of claim 13, wherein the at least one first winding is configured to, upon being provided a first current, cause a second current to be induced in the at least one second winding.

17. The wireless power transfer pad of claim 16, wherein one or more parameters of the second current dependent upon a size of a gap between the one or more vertical portions and the one or more inclined portions.

18. The wireless power transfer pad of claim 17, wherein the size of the gap between the one or more vertical portions and the one or more inclined portions is altered by repositioning the upper charging pad with respect to the lower charging pad along a horizontal axis.

19. The wireless power transfer pad of claim 13, wherein the movable magnetic structure is arranged to be moved to complete a magnetic circuit.

\* \* \* \* \*